No. 659,688. Patented Oct. 16, 1900.
N. McPHERSON.
GRASS SEEDER.
(Application filed July 23, 1900.)

(No Model.)

Witnesses.

Inventor.
N. McPherson
by Featherstonhaugh & Co
Attys.

UNITED STATES PATENT OFFICE.

NELSON McPHERSON, OF SILVERDALE STATION, CANADA.

GRASS-SEEDER.

SPECIFICATION forming part of Letters Patent No. 659,688, dated October 16, 1900.

Application filed July 23, 1900. Serial No. 24,555. (No model.)

*To all whom it may concern:*

Be it known that I, NELSON MCPHERSON, farmer, of Silverdale Station, in the county of Lincoln, in the Province of Ontario, Canada, have invented certain new and useful Improvements in Grass-Seeders, of which the following is a specification, this invention having been patented in Canada June 22, 1900, No. 67,838.

My invention relates to improvements in grass-seeders; and the object of the invention is to devise a simple and efficient means whereby grass or other seed which is to be sown broadcast may be sown quickly and efficiently and evenly; and it consists, essentially, of a tube provided with a funnel-shaped end, which is adapted to fit in the seed-bag, such funnel-shaped end extending into the tube and being provided with a feed-regulating gate, the opposite or sowing end of the tube being provided with deflecting-fingers extending inwardly at an angle into the tube, such fingers being stamped or formed out of the tube and leaving perforations therein and the parts being otherwise constructed and arranged in detail, as hereinafter more particularly explained.

Figure 1:
Figure 2:
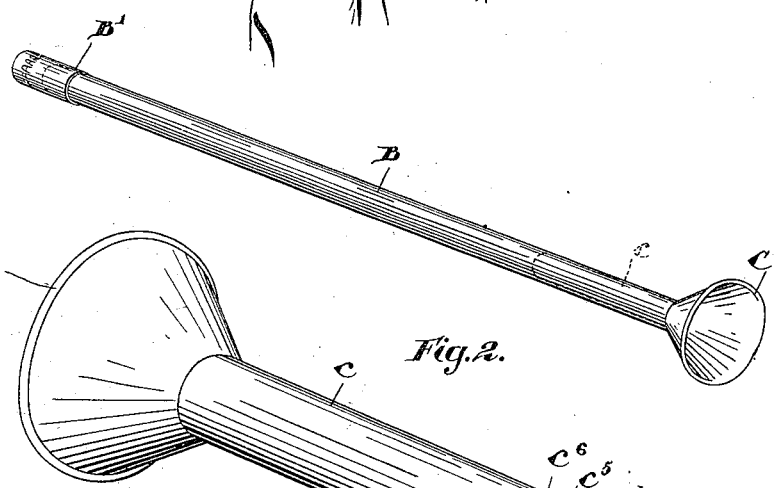
Figure 3:
Figure 4:
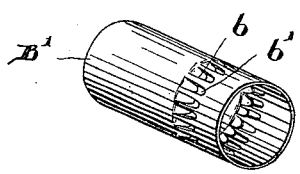

Figure 1 is a perspective view showing the practical application of my invention. Fig. 2 is an enlarged detail of the tube itself. Fig. 3 is a detail of the funnel-shaped end which fits within the tube. Fig. 4 is a detail of the sleeve on the end of the tube in which is formed the deflecting or spraying fingers.

In the drawings like letters of reference indicate corresponding parts in each figure.

A is the bag, which contains the grass, timothy, or other seed which it is desired to sow. The bag A has a hole $a$ at the lower corner, through which extends the tube B. The funnel-shaped end C fits within the corner of the bag, and the tubular end of the funnel C fits within the tube B, so that the tube is close to the hole. The inner end of the tube $c$ of the funnel-shaped end C is closed by a plate $c'$, having a substantially-sectoral opening $c^2$. A rotatable plate $c^3$, having a similar opening $c^4$, is provided, which is secured to the plate $c^3$ by a bolt and nut $c^5$ and $c^6$, respectively. When the openings $c^4$ and $c^2$ are opposite to each other, a maximum quantity of grass-seed is permitted to fall toward the discharge end of the tube, but by adjusting the nut and bolts $c^5$ and $c^6$ so as to loosen the plate $c^3$ such plate may be adjusted so as to reduce the size of the opening, and thereby limit the quantity of seed passing through the openings $c^2$ and $c^4$ toward the discharge end. The tubular end of the funnel-shaped end C fits down into the tube B, as indicated in dotted lines in Fig. 2. The opposite or discharge end of the tube B has preferably secured to it a sleeve B', which is provided with a series of deflecting-fingers $b$, which extend inwardly on an incline, the base being nearer the entrance-mouth of the tube. These fingers, it will be noticed, are punched, stamped, or otherwise formed out of the body of the tube, leaving openings $b'$.

In operation the seed fed through the tube and controlled, as hereinbefore described, is thrown by the delivering-fingers in what may be termed an "even spray" upon the ground to be seeded and necessarily is much more advantageous than sowing by hand from a bag where the seed would be distributed most unevenly. Another great advantage is that on account of the length of the tube the area covered upon each swing of the tube as it is being moved from one side to the other is much greater than what can be effected by hand, and therefore a given area of ground can be seeded in a much shorter time.

What I claim as my invention is—

1. The combination with a seed-bag having an opening at the bottom, of a tube extending through such opening and provided at the discharge end with a series of inwardly-extending deflecting-fingers as and for the purpose specified.

2. The combination with the tube having a circle of deflecting-fingers extending inwardly into the tube at one end, of a funnel extending outwardly from the opposite end as and for the purpose specified.

3. The combination with the tube having a circle of deflecting-fingers extending inwardly into the tube at one end, of a funnel extending outwardly from the opposite end and having a tubular portion extending into the feed end of the tube and means in such portion for regulating the feed as and for the purpose specified.

4. The combination with the tube having a circle of deflecting-fingers extending inwardly into the tube at one end, of a funnel extending outwardly from the opposite end and having a tubular portion extending into the feed end of the tube provided with a closing-plate having an opening in the same and a supplemental plate having a similar-sized opening to the closing-plate and rotatably held on same and clamped in position by a bolt and nut as and for the purpose specified.

5. A seeder comprising a tube having a series of inwardly-deflecting fingers extending into the tube and having the points of the fingers forward of the base and arranged in a circle as and for the purpose specified.

6. A seeder comprising a tube having a series of inwardly-deflecting fingers extending into the tube and having the points of the fingers forward of the base and arranged in a circle, such fingers being formed or stamped out of the tube as and for the purpose specified.

7. The combination with the tube having a circle of deflecting-fingers extending inwardly into the tube at one end, of a funnel extending outwardly from the opposite end and having a tubular portion extending into the feed end of the tube provided with a closing-plate having an opening in the same and a supplemental plate having a similar-sized opening to the closing-plate and rotatably held on same as and for the purpose specified.

NELSON McPHERSON.

Witnesses:
A. W. McPHERSON,
E. A. McPHERSON.